United States Patent [19]
Udren

[11] Patent Number: 4,841,405
[45] Date of Patent: Jun. 20, 1989

[54] PROTECTIVE RELAYING APPARATUS FOR PROVIDING FAULT-RESISTANCE CORRECTION

[75] Inventor: Eric A. Udren, Monroeville Boro, Pa.

[73] Assignee: Westinghouse Electric Corp., Pittsburgh, Pa.

[21] Appl. No.: 709,235

[22] Filed: Mar. 6, 1985

[51] Int. Cl.[4] ............................................. H02H 3/34
[52] U.S. Cl. ..................................... 361/80; 364/483
[58] Field of Search ........................... 361/78, 79, 80; 364/483; 324/52, 522, 525

[56] References Cited

U.S. PATENT DOCUMENTS

| | | | |
|---|---|---|---|
| 4,107,778 | 8/1978 | Nii et al. | 361/80 X |
| 4,313,169 | 1/1982 | Takagi et al. | 361/80 X |
| 4,371,907 | 2/1983 | Bignell | 361/79 X |
| 4,450,497 | 5/1984 | Bignell | 361/80 X |
| 4,455,612 | 6/1984 | Girgis et al. | 361/80 X |
| 4,570,231 | 2/1986 | Bunch | 361/80 X |

FOREIGN PATENT DOCUMENTS

| | | | |
|---|---|---|---|
| 23640 | 2/1977 | Japan | 361/79 |
| 2038120 | 7/1980 | United Kingdom | 361/80 |

OTHER PUBLICATIONS

"New Distance Protective Relay with Improved Coverage for High Resistance Earth Faults", by A. T. Johns et al., IEE Proceedings, vol. 124, No. 4, 4–1977.

Primary Examiner—A. D. Pellinen
Assistant Examiner—Derek S. Jennings
Attorney, Agent, or Firm—B. R. Studebaker

[57] ABSTRACT

Protective relay apparatus for providing a compensated fault impedance measurement for the determination of a better estimate of fault location along a transmission line is disclosed. In a power system network including local and remote generating sources disposed at respective ends of a transmission line segment of the transmission line, the protective relay apparatus is disposed at the local end of the line segment to measure the fault impedance for use in determining fault location. However, load flow conditions rendered by the generating sources interact with a fault which contributes resistance substantially to the fault impedance of the transmission line to cause an erroneous component in the fault impedance measurement rendering the determination of an erroneous fault location. The protective apparatus disclosed generates a signal as a measure of this erroneous component and compensates the fault impedance measurement as a function of the erroneous component signal, a predetermined impedance characteristic of the transmission line segment, and the fault impedance measurement to provide the compensated fault impedance measurement.

9 Claims, 5 Drawing Sheets

PROTECTIVE RELAYING APPARATUS FOR PROVIDING FAULT-RESISTANCE CORRECTION

BACKGROUND OF THE INVENTION

1. Field of the Invention:

This invention relates generally to a protective relay apparatus of the distance type, and more specifically, to an improved distance protective relay providing correction for interaction of fault resistance and power-system operating conditions.

2. Description of the Prior Art:

Three-phase ac electrical power transmission lines and power generating equipment must be protected against insulation faults and consequent short circuits or drops in shunt resistance that could cause collapse of the power system and render serious and expensive apparatus damage. For instance, such a fault condition is caused by lightning-induced flashover from a transmission line to ground or between adjacent transmission line conductors. Under such a faulted condition, line currents can increase to several times their normal value, causing loss of synchronism among generators and damaging or destroying both the transmission line and the attached equipment. To avoid equipment damage and collapse of the entire power system, faulted apparatus on the main transmission line must be isolated from the network within a short time interval, say 0.1 to 0.5 seconds, for example. The isolation time limit must allow for the operation of large circuit breakers interrupting up to 80,000 A and the completion of backup operations if these primary protective devices fail to function properly. To allow sufficient time for circuit interruption, location of the fault must be determined in approximately 8 ms to 20 ms. It is the function of the protective relays, which continuously monitor power system ac voltages and currents, to locate line faults and initiate isolation via tripping of the appropriate circuit breakers.

A distance relay is one type of protective relay used by the utility industry to protect the electrical power system. Basically, a distance relay measures the current and voltage of the power system at an end point of a transmission line to determine whether a fault exists inside or outside the protection zone of the relay. The distance relay determines the distance to the fault by calculating the line impedance, based on the measured current and voltage at the line end point. For a fault at the remote end of the protected section of a transmission line, the impedance seen by the protective relay at the local or measuring end is $V/I=Z$, where $Z$ is the line impedance. For an internal fault on the protected section of the line, $V/I<Z$. For fault beyond the protected section, $V/I>Z$. Since $Z$ is proportional to the line length between the protective relay and the fault, it is also a measure of the distance to the fault. Calculating the line impedance determines the distance to the fault. If the fault is on the protected line section or segment, the protective relay trips the appropriate circuit breakers.

Inaccuracies in the determination of the impedance due to various power system phenomena which have an effect on the voltage and current at the protective relay, can cause improper operation of distance protective relays. For example, if a fault occurs outside of the protected line segment, but the impedance determination by the protective relay indicates that the fault is on the protected line segment, the circuit breaker trips but the fault is not cleared. This is an example of overreaching of a distance protective relay. Under other circumstances, the protective relay can also underreach, i.e., not detect a fault located on the protected line segment. One cause of overreaching or underreaching, is the failure to consider residual current in the faulted circuit; another is the failure to consider the residual current in a parallel, unfaulted circuit which is magnetically coupled to the protected circuit. To overcome these problems, the protective relays must compensate for the effects of the residual current in the protected circuit (residual compensation) and in unfaulted parallel circuits (mutual compensation).

Another cause of overreaching and underreaching is the interaction of fault resistance with power-system operating conditions related to load flow prior to the fault. During normal (unfaulted) operating conditions, a distance relay measures an impedance different than that of the transmission line because it also measures the impedance of the load, and is influenced by the effect of other power sources beyond the remote but which feeds the load. If a fault occurs which is a dead short-circuit (zero impedance between or among faulted conductors), the relay measures only the impedance of the line from the relay location to the fault. However, if the fault is not a dead short-circuit, the fault impedance is added (as a complex phasor quantity) to that of the line impedance. For actual faults, the fault path itself is mainly resistive and does not necessarily produce serious errors in the reach measurement, which emphasizes inductive reactance of the line conductors.

Problems arise when power sources are connected at both ends of the line, which is normally the case in extra high voltage (EHV) transmission networks. If the fault has zero impedance, the power sources at the two ends of the line feed the fault independently, and fault current infeed from the remote terminal has no effect on the local distance relay. If the fault path has significant impedance, however, it will produce a voltage drop which is related to total current infeed from both sources. Thus, the remote current infeed can modify the impedance measured by the local relay.

If the remote current infeed is in phase with the local contribution, the voltage across the fault resistance becomes larger than it would be without the remote current. Thus, the fault appears to the local relay to have a larger resistance than it has in reality. If the tripping is based largely on reactance, the magnification of resistance will not necessarily cause a reach error.

If load was flowing in the protected transmission line prior to the fault, the sources at the two ends will have a phase difference which is proportional to the amount of load, and to the source and line impedances. This phase difference is maintained throughout the early stages of a fault. The phase difference of the remote current infeed produces a shift in the phase of the voltage drop across the fault resistance. This introduces the appearance of a reactive element of fault path impedance, even though no reactance is physically present in the fault. This reactance, in turn, causes serious errors in the location of the fault by the local relay. The relay overreaches or underreaches depending on whether the local source current leads or lags the remote infeed. The errors grow in direct proportion to the phase difference and the actual physical resistance of the fault path.

An article entitled "New Distance Protective Relay with Improved Coverage for High-Resistance Earth Faults" by A. T. Johns, and A. A. El-Alaily, appearing in the IEE Proceedings, Vol. 124, No. 4, April 1977, discloses a new protective relay of the distance relay type to improve relay operation for high-resistance earth faults. The protective relay described in this article appears to use a comparison method to compare three derived signals based on the voltages, currents, and impedances of the protected line segment. The boundary characteristic of this protective relay is automatically adjusted based on the angle of the positive-phase-sequence line impedance. The three derived signals are compared and tripping initiated when three arithmetic quantities derived from these three derived signals all lie within the limits of the boundary characteristic.

SUMMARY OF THE INVENTION

A protective relay is disposed at a local end of a line segment of a transmission line in a power system network which includes local and remote generating sources disposed at respective ends of the transmission line segment for rendering load flow conditions associated therewith. The relay apparatus operates in response to a fault along the transmission line to measure an apparent impedance corresponding to the fault in relation to the local end of the transmission line segment and to generate a signal representative thereof for use in determining the location of the fault along the transmission line. The apparent impedance measurement may include an erroneous component caused by the load flow conditions of the transmission line segment interacting with a fault which contributes resistance substantially to the fault impedance of the transmission line. The erroneous component renders the determination of an erroneous fault location.

In accordance with the present invention, the protective relay apparatus generates a first signal indicative of the load flow conditions of the transmission line segment, the first signal being used in the generation of a second signal which is representative of the erroneous component. The protective relay apparatus compensates the apparent fault impedance signal as a function of the second signal, a predetermined impedance characteristic of the transmission line segment, and the apparent fault impedance signal to provide a fault impedance measurement for the determination of a better estimate of the fault location along the transmission line.

In one embodiment, the protective relay apparatus generates a signal representative of the torque angle between the local and remote generating sources as a measure of the load flow conditions. A signal $\phi$ representative of the erroneous reactive component of the apparent fault impedance measurement may be generated as a function of the torque angle signal $\alpha$. More specifically, the signal $\phi$ may be derived in accordance with the following expression:

$$\phi = k\alpha,$$

where k may be derived in accordance with the following expression:

$$k = \frac{Z_{SL} + rZ_{line}}{Z_{line}},$$

where:

$Z_{line}$ = the value of the impedance of the line segment, $Z_{SL}$ = the value of the impedance of the local generating source, and r = factor representing the fault current distribution.

In one embodiment, the value of r may be set to correspond to the zone-1 coverage of the line segment by the protective relay apparatus. In an alternate embodiment, the value of r may be adjusted in accordance with the following expression:

$$r = X_a/X_{line},$$

where:

$X_a$ = the value of the reactive component of the apparent impedance measurement, and $X_{line}$ = the value of the reactance of the line segment.

The apparent impedance signal may be compensated to form a fault reactance signal $X_f$ in accordance with the following expression:

$$X_f = X_a + M(R_a - X_a \cot \theta) \sin \theta$$

where:

$\theta$ = the phase angle component of the impedance of the line segment, $R_a$, $X_a$ = the resistive and reactive components, respectively, of the apparent impedance signal, and M is derived by the following expression:

$$M = \frac{\sin \theta}{\sin(\phi + \theta)}.$$

In addition, the protective relay apparatus may compensate the apparent impedance signal to generate a compensated line segment fault resistance signal $R_1$ in accordance with the following:

$$R_1 = X_a \cot \theta + M(R_a - X_a \cot \theta) \cos \theta.$$

DESCRIPTION OF THE PREFERRED EMBODIMENTS

Figure 1:
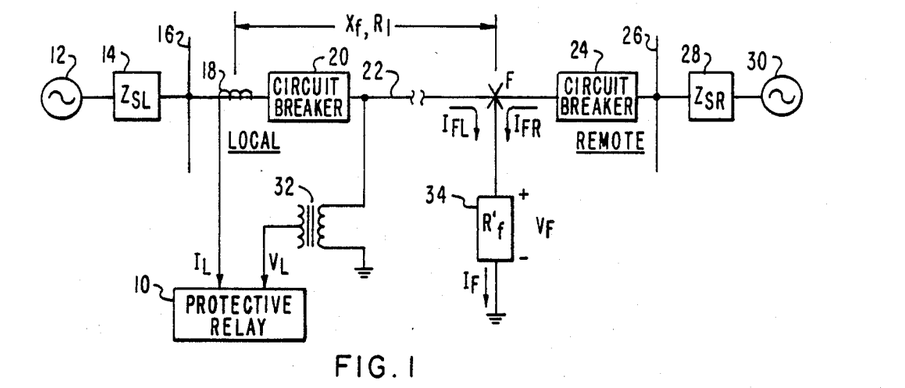
FIG. 1 is an illustrative diagram of a power transmission system suitable for embodying the concepts associated with the present invention.

FIG. 1 is a diagram of a power line transmission system 8 including a protective relay 10, which embodies the features of the present invention. The power line transmission system 8 includes an ac source 12 having a source impedance $Z_{SL}$ represented by block 14, at a local terminal, for producing an ac electrical power signal having a frequency of 50 Hz or 60 Hz, for example. The ac source 12 is coupled to a local bus 16. The power line transmission system 8 also includes an ac source 30 having a source impedance $Z_{SR}$ represented by block 28, at a remote terminal thereof. The ac source 30 is coupled to a remote bus 26. A protected transmission line segment 22 is connected to the local bus 16 via a circuit breaker 20 and to the remote bus 26 via a circuit breaker 24. A current transformer 18, located on the protected line segment 22, measures the current of the transmission line segment 22 at the local terminal and generates a signal $I_L$ representative thereof. A voltage transformer 32 measures the voltage of the line segment 22 at the local terminal and provides a signal $V_L$ representative thereof.

Continuing with FIG. 1, assume a high-resistance fault has occurred at a location F on the protected line segment 22. And, just prior to the fault occurrence a significant load current was present on the line segment 22 rendering a substantial difference $\alpha$ in the phase angles of the ac sources 12 and 30. Also, the fault current $I_f$ comprising both local and remote current infeeds differing in phase is assumed to go from the protected line segment 22 through a fault resistance ($R_f$) 34 to ground. Under these conditions, as described in the Background section hereabove, the phase difference in the remote current infeed to the fault resistance 34 introduces an apparent reactive element of fault path impedance which may produce a large error in the location of the fault as determined by the protective relay 10. More specifically, the fault infeed current components $I_{FR}$ and $I_{FL}$ being not in phase due to the phase angle difference of their respective generating sources 30 and 12 cause the voltage drop $V_F$ across the fault resistance 34 to not be in phase with the voltage at either terminal of the protected line segment 22, the effect of which introducing the false apparent reactive element to the apparent impedance as measured by the protective relay 10. Should there be a corresponding protective relay similarly disposed at the remote terminal, it also would be influenced by the same false apparent reactive element.

Figure 2:
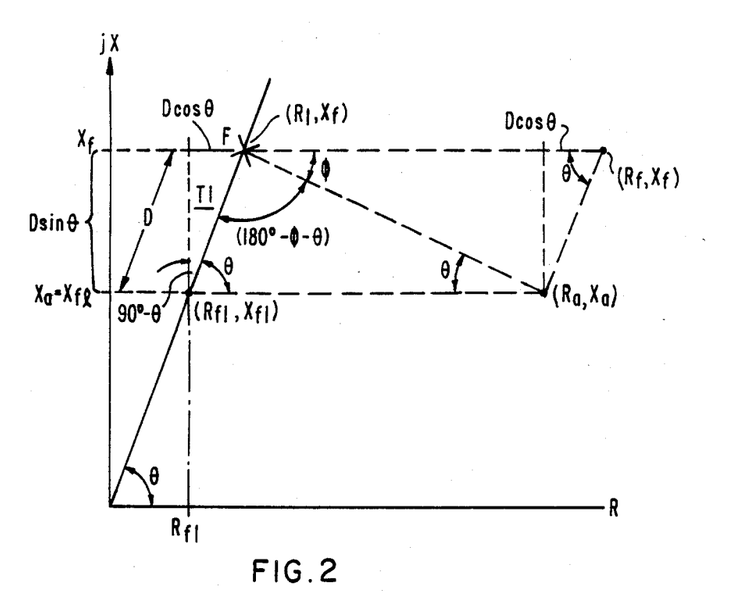
FIG. 2 is a graph of the resistance/reactance plane illustrating the compensation technique fundamentally associated with the present invention.

Turning now to the resistance/reactance orthogonal axis graph of FIG. 2, the line impedance locus of the protected line segment 22 is represented as a straight solid line forming an angle $\theta$ with the resistance R axis. Angle $\theta$ is a constant dictated by the electrical properties of the transmission line conductor. The fault is shown at a point F on the line impedance locus of the protected line segment 22. In FIG. 2, the apparent impedance, as seen from the protective relay 10, is plotted at the point labeled ($R_a$, $X_a$). Note that the apparent impedance is displaced in both the resistance and reactance directions from the fault point F. The direction of the reactance error depends upon the sign of the angular difference $\alpha$ between the ac sources 12 and 30 and causes the protective relay 10 to either overreach or underreach the intended distance setting. In the example of FIG. 2, the fault appears to be closer than it actually is, causing overreaching. Any post-fault location estimate based on the apparent impedance is also inaccurate.

FIG. 2 also illustrates the resistance $R_1$ and reactance $X_f$ of the protected line segment 22 from the local terminal to the fault; this point is designated ($R_1$, $X_f$), and denotes the actual fault location along the transmission line segment 22. The reactance $X_f$ of the protected line segment 22 plus the fault resistance $R_f$ is designated in FIG. 2 by the point ($R_f$, $X_f$). The reactance value of $X_f$, in particular, is a more accurate indication of physical fault location than $X_a$.

A method for correcting the apparent impedance ($R_a$, $X_a$) to better estimate the point ($R_f$, $X_1$) utilizing the graph of FIG. 2 is given below. To perform this correction during fault conditions, calculations of various parameters representing power system operating conditions are performed prior to fault occurrence. The calculations of these parameters may be updated periodically as load conditions change. First $\alpha$, the torque angle between the local and remote terminals, is computed as a measure of load flow conditions over line segment 22. The bus voltage as the remote terminal may be calculated using the signal $V_L$, the signal $I_L$, and a stored value of the line impedance, $|Z|\exp(j\theta)$. The remote bus voltage is equal to the voltage $V_L$ at the local terminal minus the voltage drop associated with the current $I_L$ through the line impedance Z. The torque angle $\alpha$ may be derived from the local and remote bus voltage signals. Thereafter, a phase representative quantity $\phi$ which introduces the false apparent reactive element may be computed as a function of the torque angle $\alpha$ from the equation $\phi = k\alpha$, where k may be a fixed or variable value, the determination of which being explained in greater detail hereinbelow. In addition, a coefficient M which will be used in subsequent computations may be derived as follows:

$$M = \frac{\sin \theta}{\sin(\theta + \phi)}, \quad (1)$$

where $\theta$ is the phase angle of the protected line segment 22 as described above.

Now, when the fault occurs, the apparent reactance $X_a'$ and resistance $R_a'$ from the protective relay 10 to the fault is obtained conventionally using the relay 10. There are many well-known methods for performing this calculation. Also, the apparent reactance and resistance values may be compensated for residual current flow through the faulted phase conductor and mutual effects due to current flow in nearby non-faulted conductors using well-known techniques yielding compensated apparent values $X_a$ and $R_a$. The compensated apparent value of reactance $X_a$ may be used to effect a point ($R_{f1}$, $X_{f1}$) on the line impedance locus of the graph in FIG. 2 such that $X_a = X_{f1}$ and accordingly, $R_{f1} = X_a \cot \theta$. Next, the distance D along the line impedance locus from the point ($R_{f1}$, $X_{f1}$) to the fault point ($R_1$, $X_f$) may be derived using the law of sines as follows:

$$D = (R_1, X_f) - (R_{f1}, X_{f1}) = \frac{(R_a - R_{f1}) \sin \phi}{\sin(180° - \phi - \theta)} \quad (2)$$

$$= \frac{(R_a - R_{f1}) \sin \theta}{\sin(\phi + \theta)}, \quad (3)$$

where the graph of FIG. 2 illustrates the various angles and points in the above equations.

Using dimension D as the hypotenuse of a right triangle, T1, it is possible to estimate $X_f$ (the line reactance to the fault), $R_1$ (the line resistance to the fault), and $R_f$ (the resistance $R_1$ of the protected line segment 22 to the fault plus the fault resistance $R_f$). Equations for estimating the fault location by the quantities $X_f$ and $R_1$ derived from the right triangle T1 of the graph of FIG. 2 are shown below:

$$X_f = X_{f1} + D\cos(90° - \theta); \quad (4)$$
$$= X_{f1} + D\sin\theta; \quad (5)$$
$$R_1 = R_{f1} + D\sin(90 - \theta); \quad (6)$$
$$= R_{f1} + D\cos\theta; \text{ and} \quad (7)$$

since the fault resistance $R_a - R_{f1}$ remains fixed, then $$R_f - R_1 = R_a - R_{f1}, \text{ and} \quad (8)$$
$$R_f = R_a + (R_1 - R_{f1}), \text{ or} \quad (9)$$
$$R_f = R_a + D\cos\theta. \quad (10)$$

Figure 3:
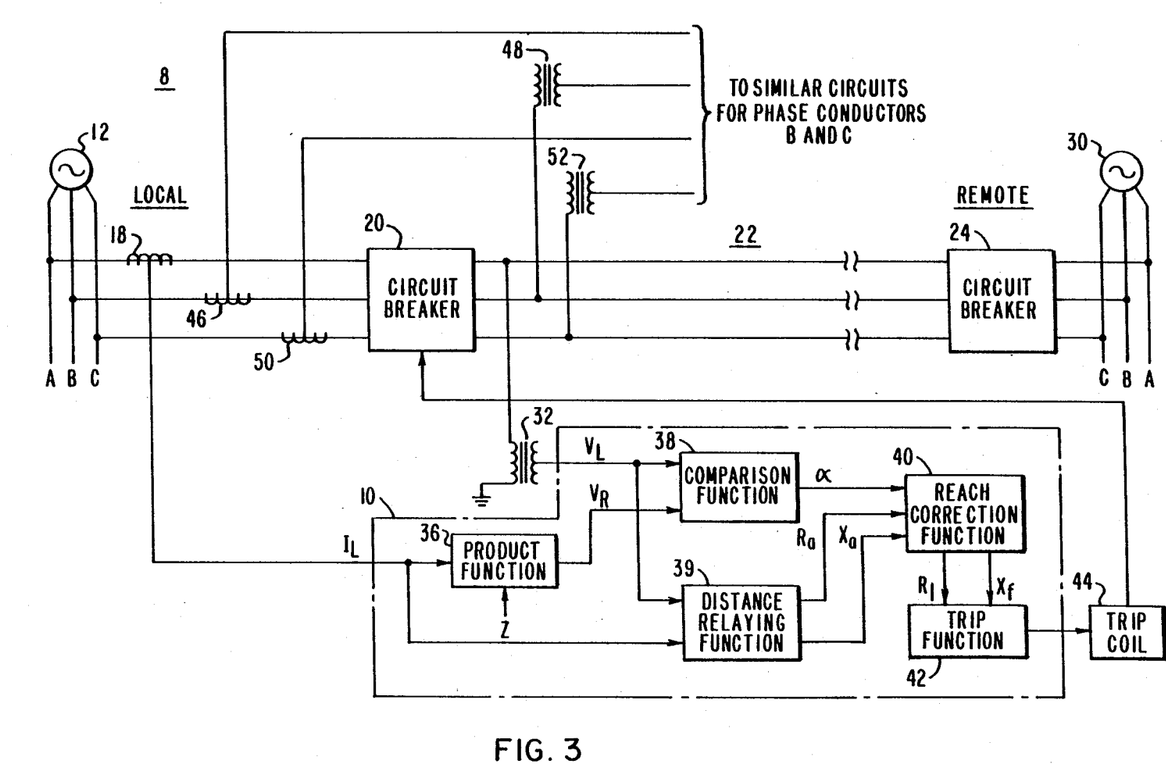
FIG. 3 is an illustrative diagram of a power transmission system including a functional block diagram schematic of a protective relay suitable for embodying the inventive compensation aspect of the present invention.

FIG. 3 illustrates the power line transmission system 8, including a functional block diagram schematic of an embodiment of the protective relay 10 of FIG. 1, and all three phase conductors thereof. The components of FIG. 3 are similar in structure and function to the components bearing identical reference characters in FIG. 1. For convenience, the local bus 16, remote bus 26, and source impedances 14 and 28 are not shown in FIG. 3, but are assumed present.

The protective relay 10 may include a product functional block 36 for multiplying the current signal $I_L$ associated with the phase conductor A by the line impedance. The product function 36 produces a signal $V_R$, representative of the voltage associated with phase A at the remote terminal of the protected line segment 22. The voltage signals $V_L$ and $V_R$ may be input to a comparison functional block 38 for determining the torque angle $\alpha$ between the ac sources 12 and 30. In addition, the signals $V_L$ and $I_L$ may be supplied to a conventional distance relaying function 39 for obtaining the compensated apparent resistance and reactance values $R_a$ and $X_a$, respectively, using well-known techniques. The signal $\alpha$ representing the torque angle and the signals $R_a$ and $X_a$ may be input to a functional block 40 which may be a microprocessor-based embodiment for performing the fault resistance correction functions illustrated in FIG. 2. The functional block 40 produces the corrected signals designated $R_1$ and $X_f$. As described in conjunction with FIG. 2, these signals $R_1$ and $X_f$ represent an improved estimate for determining whether or not the fault location is on the transmission line segment 22. This determination may be accomplished by a trip functional block 42 which may utilize well-known distance relaying functions based on the corrected reactance signal $X_f$ alone or both of the corrected resistance ($R_1$) and reactance ($X_f$) signal values. If the trip function 42 determines that the fault is on the protected line segment 22, a trip coil 44 may be activated to trip the circuit breaker 20.

Also shown in FIG. 3 is a current transformer 46 for producing a signal representative of the current in the phase conductor B, and a voltage transformer 48 for producing a signal representative of the voltage from the phase conductor B to ground. A protective relay (not shown) similar to the protective relay 10 responds to these two signals for detecting faults on the phase conductor B. Also, there is shown a current transformer 50 for producing a signal representative of the current in the phase conductor C and a voltage transformer 52 for producing a voltage representative of the voltage from the phase conductor C to ground. A protective relay (not shown) similar to the protective relay 10 is responsive to these two signals for detecting faults on the phase conductor C. Also not shown in FIG. 3 are inputs to protective relay 10 from the residual (sum) circuit of the three-phase current transformer set 18, 46, and 50. This input is routinely used in the distance measurement and reach correction circuit or its equivalent to compensate for reach errors in ground distance measurement according to well-known methods. Similarly, FIG. 3 does not show an input to the distance measurement and reach correction circuit for the residual current in the secondary circuits of parallel transmission lines which are inductively coupled to the protected line 22. The foregoing circuits are conventionally used and well-known in the art and in themselves form no part of the present invention.

Figure 4:
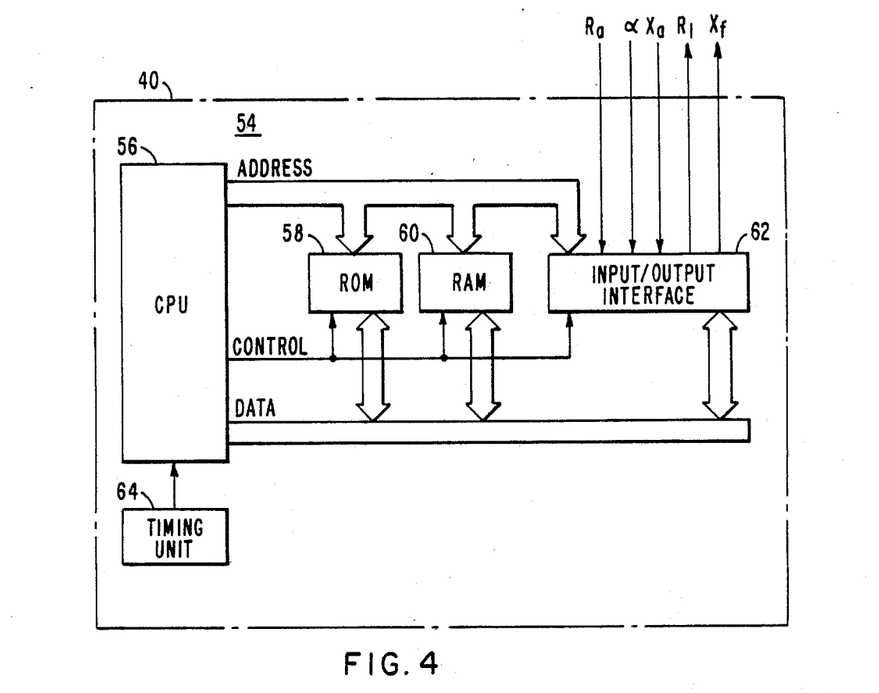
FIG. 4 is a block diagram schematic of a microcomputer system suitable for use in the embodiment depicted in FIG. 3.

The functional block 40 may be implemented with a digital computer apparatus, or more specifically, a microcomputer system. FIG. 4 is a block diagram schematic of a microcomputer system 54 suitable for performing the functions described hereabove in connection with block 40. Specifically, the microcomputer system 40 may include the following conventional elements: a central processing unit (CPU) 56, a read-only memory (ROM) 58, a random-access memory (RAM) 60, and an input/output interface 62. In operation, the CPU 56 communicates via an address bus with the ROM 58, the RAM 60, and the input/output interface 62. Via control lines, shown as a single bold line in FIG. 4, the CPU 56 controls the ROM 58, The RAM 60, and the input/output interface 62. Data is transferred bidirectionally on the data bus, which connects the CPU 56 with the ROM 58, the RAM 60, and the input/output interface 62. The input/output interface 62 may be responsive to signals including the signals representing $R_a$, $X_a$, and the torque angle ($\alpha$). As discussed in conjunction with FIG. 3, the embodiment 40, via the input-/output interface 62, provides signals $R_1$ and $X_f$ to the trip function 42 as depicted in FIG. 4. A timing unit 64 provides appropriate timing signals to the CPU 56.

Figure 5:
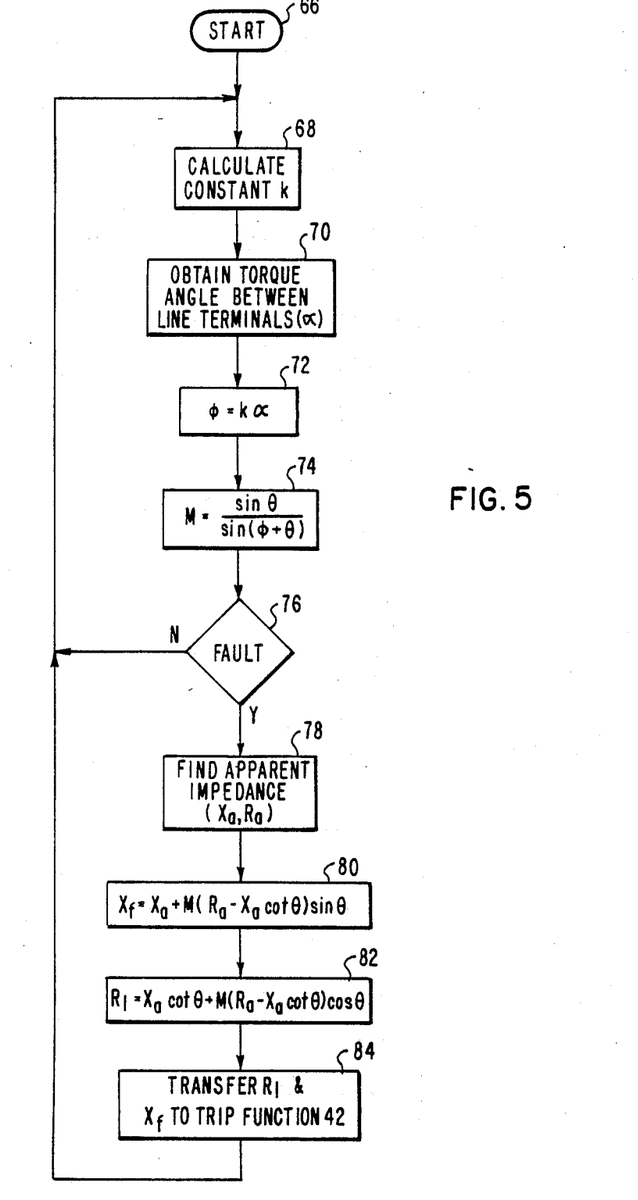
FIG. 5 is a software flow chart illustrating one method of programming the central processing unit of the microcomputer system of FIG. 4 to perform the compensation techniques.

FIG. 5 illustrates a software flow chart of the foregoing described compensation technique suitable for preparing an implementable instruction program or programs for use by the microcomputer system 54. The compensation flow chart is entered at a starting point 66. At a step 68, the constant k may be calculated as will be explained hereinbelow. At a step 70, the torque angle $\alpha$, between the line terminals, may be obtained; at a step 72, k and $\alpha$ may be multiplied to produce the phase quantity $\phi$. At a step 74, equation (1) above may be used to calculate M. At a decision step 76, a determination may be made regarding whether a fault is present. If a fault is present, processing continues through the compensation process at step 78. If a fault is not present, processing returns to the step 68 where the constant k is again calculated.

If the result from decision step 76 is affirmative, at step 78 the compensated apparent impedance, designated ($X_a$, $R_a$) may be conventionally obtained as described above in connection with the embodiment of FIG. 3. At a step 80, the reactance $X_f$ of the phase conductor on which the fault has occurred may be calculated using the equations (3) and (5) described hereabove. Moving to a step 82, the resistance $R_1$ of the faulted phase conductor may be calculated using the equations (3) and (7) described hereabove. At a step 84, the values $X_f$ and $R_1$ are transferred to the trip function 42 via I/O interface 62 for determining whether the fault is internal or external the line segment 22.

The discussion of the software flow chart of FIG. 5 is intended for purposes of illustration and not limitation. It is anticipated that alternative embodiments of the present invention may be conceived wherein the location of instructions for performing the compensation is different from that shown in the discussed flow chart. These alternative embodiments are believed to fall within the spirit and scope of the present invention as claimed hereinafter. The novel compensation technique may also be implemented using traditional hardware circuit techniques or a combination of software and hardware designs.

k is a setting constant that provides the reactance-error angle $\phi$ as a function of the pre-fault line torque angle $\alpha$, according to the equation $\phi = k\alpha$. Since $\phi$ depends upon the source angle difference and the impedances from the ac sources 12 and 30 to the fault, the setting of k is based on the normal (usually the minimum) values of source impedances 14 and 28. The following setting equations can be used for the zone-1 distance relay at the local terminal:

$$k = \left[\frac{Z_{SL} + Z_{line} + Z_{SR}}{Z_{line}}\right] \cdot \left[\frac{Z_{SL} + rZ_{line}}{Z_{SL} + Z_{line} + Z_{SR}}\right] \quad (11)$$

$$k = \frac{Z_{SL} + rZ_{line}}{Z_{line}},$$

and at the remote terminal:

$$k = \left[\frac{Z_{SL} + Z_{line} + Z_{SR}}{Z_{line}}\right] \cdot \left[\frac{Z_{SR} + rZ_{line}}{Z_{SL} + Z_{line} + Z_{SR}}\right] \quad (12)$$

$$k = \frac{Z_{SR} + rZ_{line}}{Z_{line}},$$

where:
  $r \omega 0.9$ and corresponds to the zone-1 coverage of the protected line,
  $Z_{line}$ = impedance from local bus 16 to remote bus 26,
  $Z_{SL}$ = local source impedance,
  $Z_{SR}$ = remote source impedance.

The first factor in brackets in both equations (11) and (12) above transforms the line torque angle $\alpha$ to a source-angle difference. The second factor adjusts for fault current distribution factors for the end-of-zone-1 fault at a particular installation. If heavy load current flow precedes the high-resistance fault, and most of the fault current is supplied by the ac source 30 at the remote terminal, a large apparent reactance error is produced at the local terminal. If most of the current is supplied from the ac source 12 at the local terminal, a small reactance error results. The above equations (11) and (12) for determining k and the compensation technique handle these different situations correctly.

Figure 6:
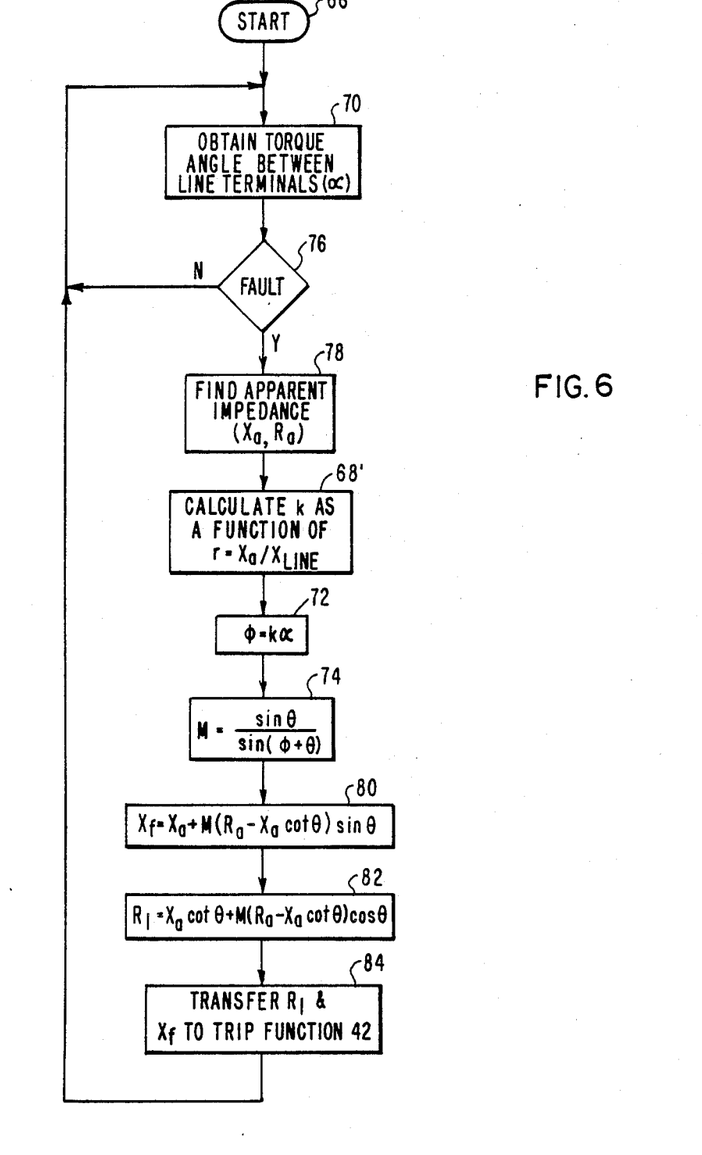
FIG. 6 is a software flow chart illustrating an alternate method of programming the central processing unit of FIG. 4 to perform the compensation techniques.

As discussed hereinabove, the compensation technique may also be used for post-fault estimation of the physical location of the fault on the protected line segment 22. The flow chart of FIG. 5 has been reconfigured in FIG. 6 to exemplify a suitable embodiment for this case in which the setting of the value k is not fixed, but instead, computed after the fault occurrence using a variable value of r determined by the equation $r = X_a/X_{line}$, for example, rather than the fixed value $r \simeq 0.9$ (see block 68' in FIG. 6). This change optimizes the compensation technique according to the actual fault location, rather than for the end-of-zone-1 case, which is the critical case for the relaying decision. For an improved fault location estimate, if the compensated line-terminal-to-fault reactance $X_f$ is substantially different from the initial apparent reactance $X_a$, then k can be recomputed using a new value of r from the equation $r = X_f'/X_{line}$, where $X_f'$ is the first estimate of $X_f$. Then, a more accurate second estimate of $X_f$ may be recalculated. A plurality of computational iterations may be performed to more accurately estimate $X_f$, but only two such iterations is believed sufficient.

Note that if power apparatus outages or switching events raise the source impedance at either terminal (14 or 28 in FIG. 1) above the assumed minimum values, then the compensation method described herein may perform less-than-normal compensation—a conservative and relatively secure response to the change in system conditions. The compensation of relaying or fault location can be further improved if data on source equipment status and resulting source impedances are available at the time of the fault. These impedance values can be used to adjust k. One example of a method for determining source impedance is to measure the changes in the voltage and current, $\Delta V$ and $\Delta I$ on the fault phase at the moment of the fault. Then the local source impedance $Z_{SL}$ is found from $$Z_{SL} = \Delta V/\Delta I \quad (13)$$

and k is corrected accordingly.

The description of the invention presented above emphasizes the use of the correction method for single-phase-to-ground faults, which are the most common type, However, the technique applies equally well for correcting reach of phase-distance relays, which use current and voltage signals from multiple phases in combination to determine the distance of phase-to-phase, two-phase-to-ground, and three-phase faults. In these cases, out-of-phase current contributions to the fault arc from out-of-phase sources yield an arc voltage which shows an apparent arc reactance, with effect on reach accuracy of the relays as discussed before. The correction is determined and applied in exactly the same fashion.

What is claimed is:

1. Protective relay apparatus for use at a local end of a line segment of a transmission line in a power system network, said network including local and remote generating sources disposed at respective local and remote ends of said transmission line segment for rendering load flow conditions associated therewith, said relay apparatus operative in response to a fault along said transmission line to measure an apparent impedance corresponding to said fault in relation to the local end of said transmission line segment and to generate a signal representative thereof for use in determining the location of said fault along said transmission line, said apparent impedance measurement, at times, including an erroneous component caused by said load flow conditions of said transmission line segment interacting with a fault which contributes resistance substantially to the fault impedance of the transmission line, said erroneous component rendering the determination of an erroneous fault location, said protective relay apparatus comprising:

first means for generating a first signal indicative of the load flow conditions of said transmission line segment;

second means for generating a second signal representative of said erroneous component as a function of said first signal;

means for compensating said apparent fault impedance signal as a function of said second signal, a predetermined impedance characteristic of a transmission line segment, and an apparent fault impedance signal to generate a compensated fault impedance signal, thereby providing a fault impedance measurement for the determination of a better estimate of the fault location along the transmission line.

2. The protective relay apparatus in accordance with claim 1 wherein the first generating means includes means for deriving a signal representative of the torque angle between the local and remote generating sources as a measure of the load flow conditions.

3. The protective relay apparatus in acordance with claim 2 wherein the first generating means includes:

means for measuring the current and voltage of the line segment at the local end thereof and for generating signals representative thereof;

means for deriving a remote voltage signal of the line segment as a function of the generated local current signal and a predetermined impedance value of the line segment; and means governed by the generated local and derived remote voltage signals to derive a signal representative of the phase angle difference therebetween which is a measure of their torque angle.

4. The protective relay apparatus in accordance with claim 2 wherein the second generating means includes means for deriving a signal $\phi$ representative of an erroneous reactive component of the apparent fault impedance signal as a function of the torque angle signal $\alpha$.

5. The protective relay apparatus in accordance with claim 4 wherein the second generating means includes means for deriving the signal $\phi$ representative of the erroneous reactive component in accordance with the following expression:

$$\phi = k\alpha,$$

where k may be derived in accordance with the following expression:

$$k = \frac{Z_{SL} + rZ_{line}}{Z_{line}},$$

where:

$Z_{line}$ is the value of the impedance of the line segment, $Z_{SL}$ is the value of the impedance of the local generating source, and r is a factor representing the fault current distribution.

6. The protective relay apparatus in accordance with claim 5 wherein the second generating means includes means for setting the value of r to correspond to the zone-1 coverage of the line segment.

7. The protective relay apparatus in accordance with claim 5 wherein the second generating means includes means for adjusting r in accordance with the following expression:

$$r = X_a/X_{line},$$

where:

$X_a$ is the value of the reactive component of the apparent impedance measurement, and $X_{line}$ is the value of the reactance of the line segment.

8. The protective relay apparatus in accordance with claim 4 wherein the compensating means includes means for compensating the apparent impedance signal to generate a compensated fault reactance signal $X_f$ in accordance with the following expression:

$$X_f = X_a + M(R_a - X_a \cot \theta)\sin \theta,$$

where:

$\theta$ is the phase angle component of the impedance of the line segment, $R_a$ and $X_a$ are the resistive and reactive components, respectively, of the apparent impedance signal, and M is derived by the following expression:

$$M = \frac{\sin \theta}{\sin(\phi + \theta)}.$$

9. The protective relay apparatus in accordance with claim 4 wherein the compensating means includes means for compensating the apparent impedance signal to generate a compensated line segment fault resistance signal $R_1$ in accordance with the following expression:

$$R_1 = X_a \cot \theta + M(R_a - X_a \cot \theta)\cos \theta,$$

where:

$\theta$ is the phase angle component of the impedance of the line segment, $R_a$ and $X_a$ are the resistive and reactive components, respectively, of the apparent impedance signal, and M is derived by the following expression:

$$M = \frac{\sin \theta}{\sin(\phi + \theta)}.$$

* * * * *